(12) United States Patent
Watanabe et al.

(10) Patent No.: US 6,697,201 B2
(45) Date of Patent: Feb. 24, 2004

(54) DISPLAY APPARATUS AND METHOD FOR AUTOMOTIVE VEHICLE

(75) Inventors: Hiroshi Watanabe, Yokohama (JP); Masao Sakata, Yokohama (JP); Satoru Hirose, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/261,938

(22) Filed: Oct. 2, 2002

(65) Prior Publication Data

US 2003/0067432 A1 Apr. 10, 2003

(30) Foreign Application Priority Data

Oct. 5, 2001 (JP) ........................................ 2001-309330

(51) Int. Cl.⁷ .............................................. G02B 27/14
(52) U.S. Cl. ..................................................... 359/630
(58) Field of Search ................................ 359/629, 630, 359/618, 634; 345/7, 8, 9

(56) References Cited

U.S. PATENT DOCUMENTS

| | | | |
|---|---|---|---|
| 5,059,957 A | | 10/1991 | Todoriki et al. ............ 340/705 |
| 5,543,870 A | * | 8/1996 | Blanchard ..................... 353/74 |
| 5,757,544 A | * | 5/1998 | Tabata et al. ................ 359/434 |
| 6,498,679 B2 | * | 12/2002 | Lee et al. .................... 359/483 |
| 6,542,265 B2 | * | 4/2003 | Kanda et al. .................. 359/15 |

FOREIGN PATENT DOCUMENTS

JP  01-248885  10/1989

* cited by examiner

*Primary Examiner*—Ricky Mack
(74) *Attorney, Agent, or Firm*—McDermott, Will & Emery

(57) ABSTRACT

In display apparatus and method applicable to an automotive vehicle, a display image is projected over a screen section, the screen section having a first screen enabled to switch its state between a light transmission state in which the projected display image is transmitted therethrough and a light diffusion state in which the projected display image is projected thereon and a second screen enabled to switch its state between the light transmission state and the light diffusion state, a field of view limiting section (louver filter) is interposed between the first screen and second screen for limiting a field of view of a predetermined direction, and a controlling section controllably switches the respective states of the first and second screens.

20 Claims, 7 Drawing Sheets

DISPLAY APPARATUS AND METHOD FOR AUTOMOTIVE VEHICLE

BACKGROUND OF THE INVENTION

1. Field of the Invention

The present invention relates to a rear projection type display apparatus and method for an automotive vehicle in which a field of view can arbitrarily be controlled.

2. Description of the Related Art

A Japanese Patent Application First Publication No. Heisei 1-248885 published on Oct. 4, 1989 (which corresponds to a U.S. Pat. No. 5,059,957 issued on Oct. 22, 1991) exemplifies a previously proposed display apparatus for the automotive vehicle.

In the previously proposed display apparatus disclosed in the above-described Japanese Patent Application First Publication, a liquid crystal filter is installed on a display screen as means for controlling a field of view in the display apparatus. A characteristic of the liquid crystal filter is varied so as to achieve such a technique as limiting a display for a vehicular driver during a vehicular run.

SUMMARY OF THE INVENTION

However, if the characteristic of the liquid crystal filter is varied, a transmittance of a whole display screen is reduced and even the information to be displayed becomes unclear.

In addition, a louver filter used in the limitation of a field of view limits, in general, fixedly a predetermined field of view. Hence, it is impossible to control arbitrarily a timing of the limitation of the field of view or to control arbitrarily the field of view limitation in a direction different from each region of a displayed image.

It is, hence, an object of the present invention to provide display apparatus and method which are capable of arbitrarily controlling a field of view region of a display and a timing of the display, while maintaining a clear display of a display image.

The above-described object can achieved by providing a display apparatus comprising: a projecting section that projects a display image; a first screen enabled to switch its state between a light transmission state in which the projected display image is transmitted therethrough and a light diffusion state in which the projected display image is projected thereon; a second screen enabled to switch its state between the light transmission state and the light diffusion state; a field of view limiting section interposed between the first screen and second screen to limit a field of view of a predetermined direction; and a controlling section that controllably switches the respective states of the first and second screens.

The above-described object can also be achieved by providing a display method comprising: projecting a display image; providing a first screen enabled to switch its state between a light transmission state in which the projected display image is transmitted therethrough and a light diffusion state in which the projected display image is projected thereon; providing a second screen enabled to switch its state between the light transmission state and the light diffusion state; providing a field of view limiting section interposed between the first screen and second screen to limit a field of view of a predetermined direction; and controllably switching the respective states of the first and second screens.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Before explaining a first embodiment of a display apparatus according to the present invention, a principle of controlling a limitation on a field of region will be described with reference to FIGS. 1A and 1B.

It is noted that a field of view used in the specification is defined as a range of an image viewable for an observer (in a case of a vehicle, a vehicular occupant such as a driver) with respect to a projected display image.

Figure 1A:
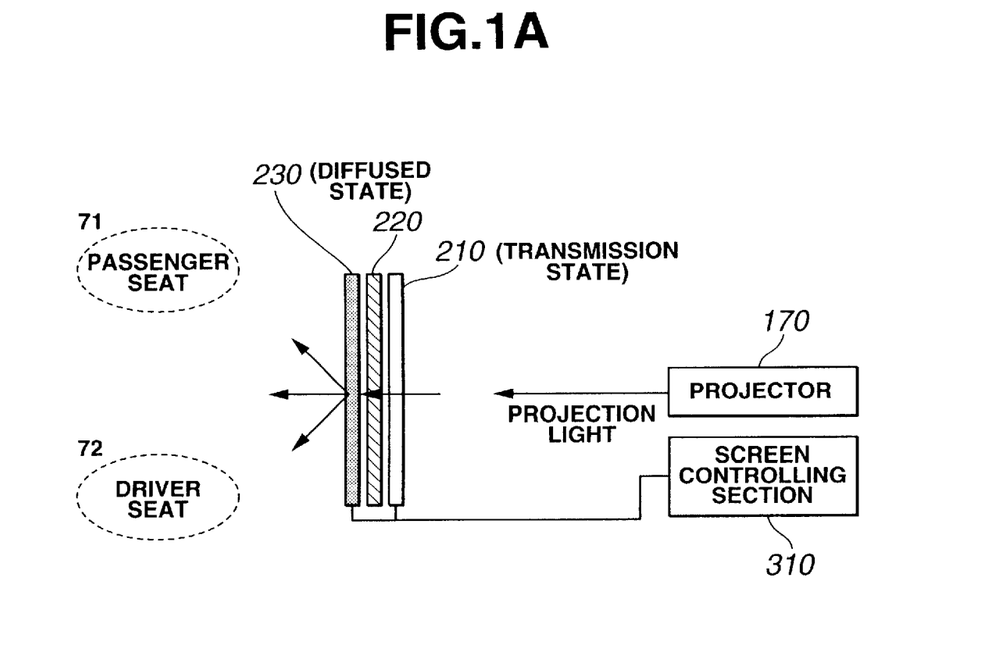
FIGS. 1A and 1B are explanatory views for explaining a principle of field of view no-limitation in a display apparatus according to the present invention and explaining a principle of field of view limitation therein.
Figure 1B:
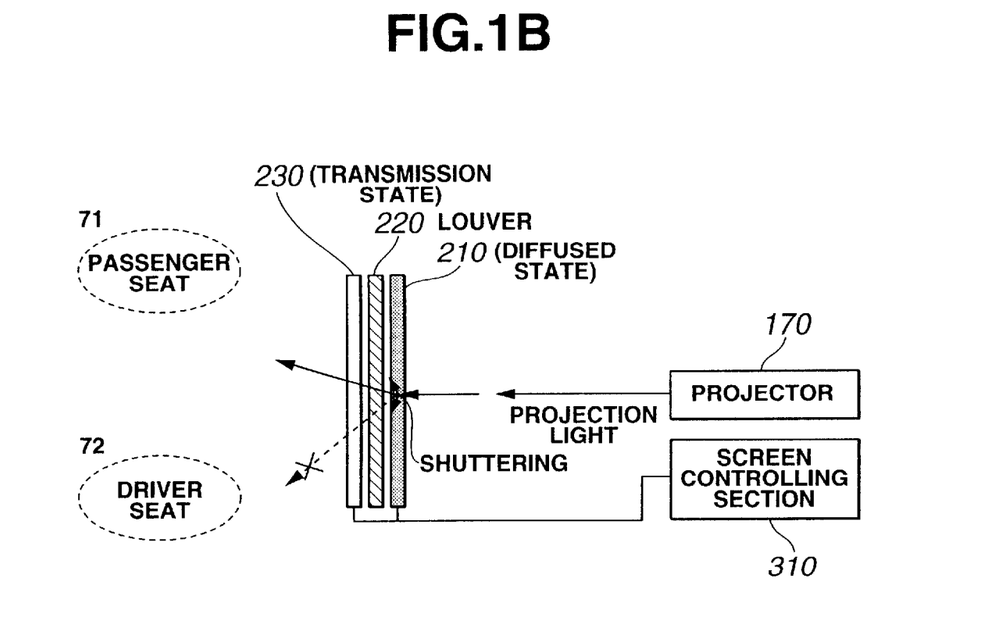

It is also noted that, although a specific explanation of the principle of control with reference to FIGS. 1A and 1B is made in slight details in order to facilitate a better understanding of the present invention, this does not limit the present invention. First screen and second screen which are capable of switching between a state in which a display image is transmitted and a state in which the projected display image is projected are displayed on both surfaces of a field of view controlling section that limits the field of view in a predetermined direction and a controlling section that controls respective display states of both first and second screens. A dispersion type liquid crystal has been adopted for each of the first and second screens in order to permit the switching between the state in which the display image is transmitted and the state in which the projected display image is projected. A voltage application or non-application to one of the first and second screens controls a state of non-display or display. Specifically, if the given voltage is applied across the liquid crystal, a molecular structure of the liquid crystal is varied and arranged in row and a non-display (in a state where the display image is transmitted) is resulted. On the other hand, if no voltage is applied thereacross, the molecular structure of the liquid crystal becomes irregular. Then, a light diffused state is developed so that the display image is displayed. It is noted that, in a case where a liquid crystal material is adopted, the molecular array structure of the liquid crystal material is not specifically limited but may be constituted by any one of smectic liquid crystal, nematic liquid crystal, and cholestic liquid crystal.

As described above, in the present invention, the light transmission state and the light diffused state can be realized depending upon an application of the given voltage described above. In the case of the present invention, the display image is displayed by a combination of these states of two sheets of screen.

Furthermore, the field of view of the display image is limited according to field of view image limiting section whose surfaces are covered with the respective first and second screens. That is to say, in a case where the display image is formed with the first screen located on a more projector side than the field of view limiting section, the display image is visually recognized on in a predetermined direction upon the receipt of the limitation of the field of view limiting section. However, in a case where the display image is formed with the second screen located on one surface of the field of view limiting section which faces toward a viewer in the light diffused state, the display image is visually recognized state in every direction without receiving the limitation by field of view limiting section.

First screen 210 and second screen 230 shown in FIG. 1A do not receive the field of view limitation and receives the field of view limitation in a case shown in FIG. 1B.

In FIG. 1A, a screen controlling section 310 applies a given voltage to first screen 210 so as to fall in the light transmission state and does not apply the predetermined voltage to second screen 230 so as to fix the light diffuses state. In this state, the projected light from a projector 170 transmits first screen 210, transmits the field of view limiting section 220, and is diffused over second screen 230. Consequently, users positioned on driver seat and passenger seat can visually recognize the projected image.

On the other hand, in the case of FIG. 1B, first screen 210 is in the light diffused state and second screen 230 is in the light transmission state. In this case, the display image diffused over and formed on first screen 210 receives the limitation by field of view limiting section. Although it is possible to visually recognize the display image diffused over and formed on first screen 210 from the passenger seat 71, it is impossible to visually recognize the same display image from driver seat 72.

According to the present invention, a combination control of the field of view control by field of view controlling section 220 and control of light transmitted state or light diffused state by the two sheets of screen can provide the display apparatus for controlling the field of view at an arbitrary region and at an arbitrarily timing by controlling respective states of the two sheets of screen and, hence, can provide clear and high-quality display image without a reduction of a transmittance of the whole display image. From the similar viewpoint, the same action and advantage as described above can be obtained from the action and advantages to which the same principle of control in the same way as described above is applicable.

Especially, in the display apparatus mounted in the vehicle, such an individual demand is present that a field of view region and/or a display timing should be changed according to a vehicular traveling state.

That is to say, in a case where the vehicle is, for example, now traveling, it is desirable to concentrate the vehicular driver's mind on a vehicular driving. At this time, since the display image does not fall in the field of view of the driver, an attention force of the driver can be improved. In this way, from such an individual demand as to limit the field of view region of the driver or the display to the driver according to the travel sate of the vehicle, a traveling state detecting section to detect the travel state of the vehicle is provided to control the states of the first and second screens in accordance with the detected travel state. According to the present invention, the travel state includes every state that gives an influence on an attention force of the vehicle driver such as a state whether the vehicle is traveling, an information whether a temporary vehicular stop or the vehicle is in a parking state, and the information on whether the vehicle is driving at a high speed or at a low speed. According to the present invention, there is provided the display apparatus which controls the display image so as to enable a driving attention force of the vehicle driver to highly be maintained according to a limitation of the field of view of the display image in accordance with the traveling state of the vehicle.

Figure 2:
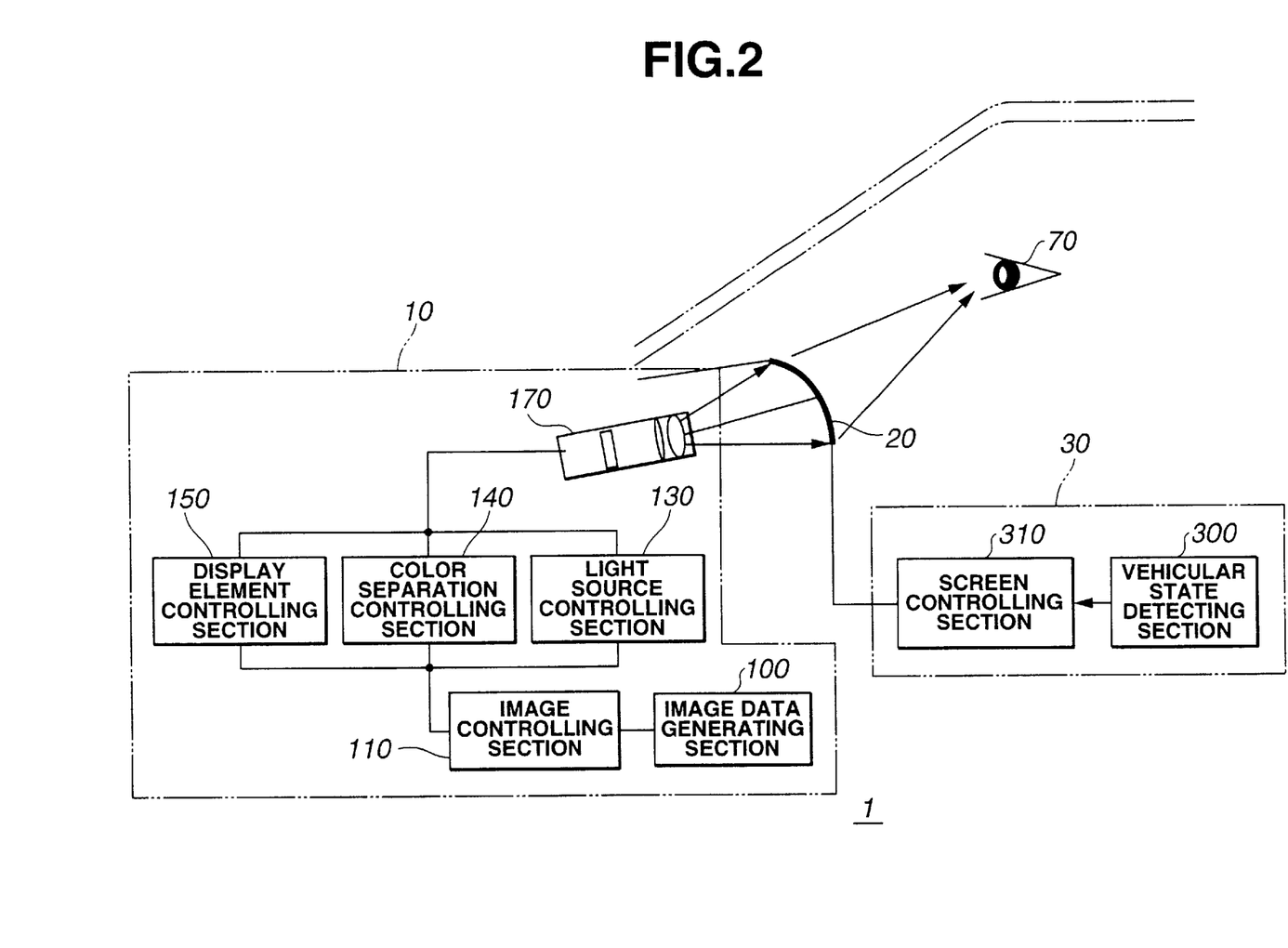
FIG. 2 is a block diagram representing a rough configuration of the display apparatus in a preferred embodiment according to the present invention.
Figure 3:
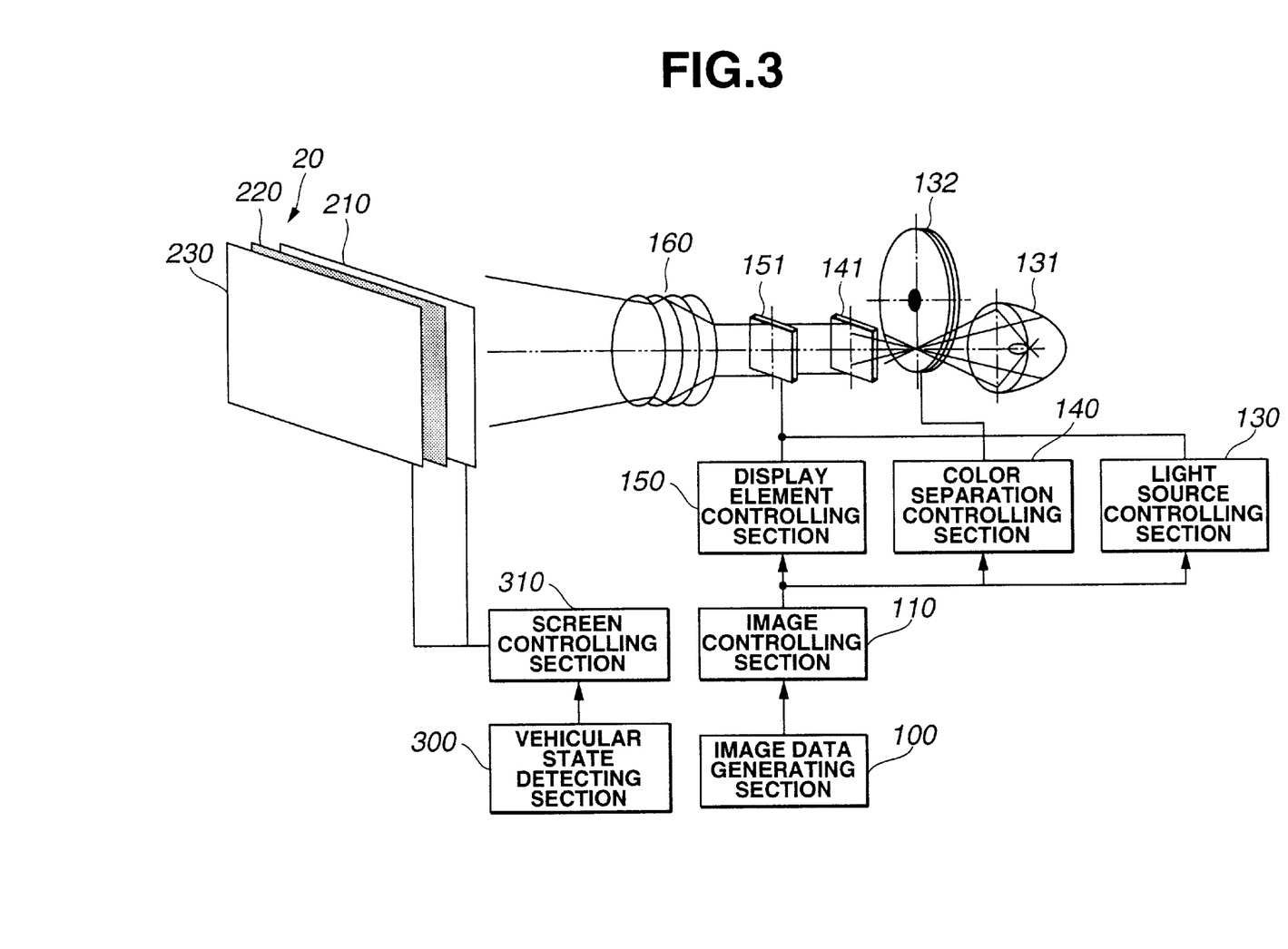
FIG. 3 is a circuit block diagram representing a structure of the display apparatus shown in FIG. 2 in a preferred embodiment according to the present invention.
Figure 4:
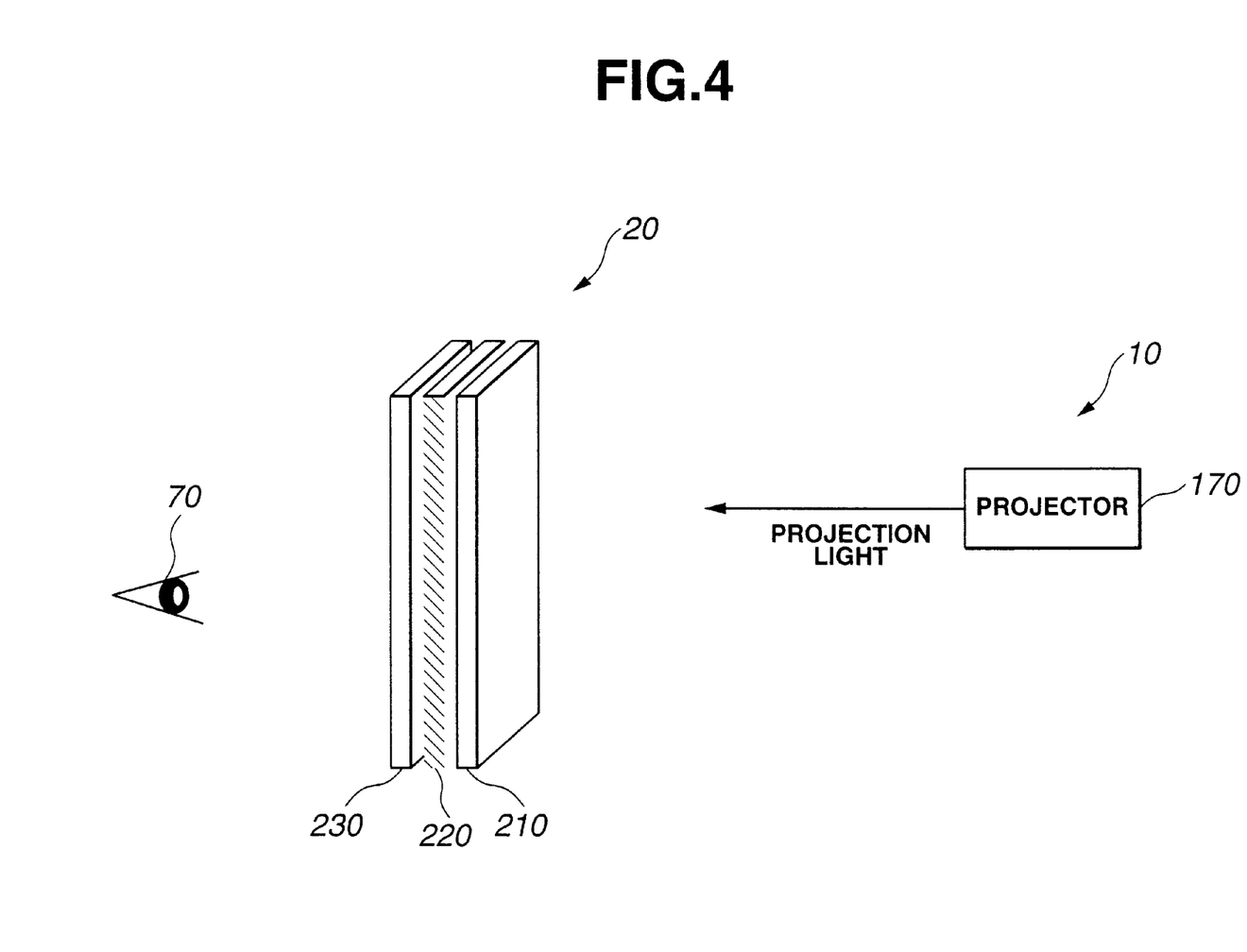
FIG. 4 is an explanatory view representing a positional relationship between the display apparatus shown in FIG. 3 and a viewer such as a vehicular occupant.
Figure 5A:
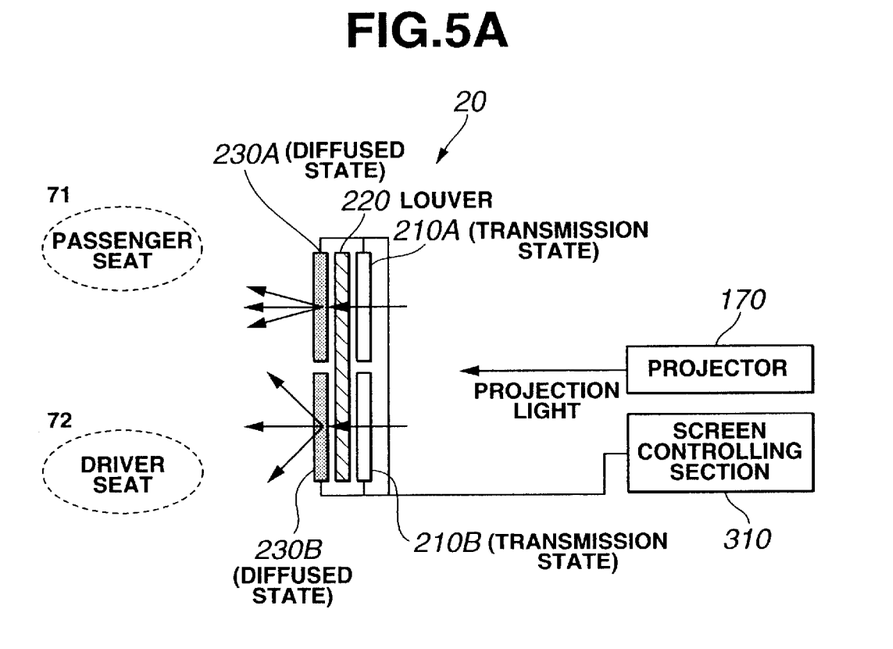
FIGS. 5A and 5B are explanatory views for explaining a first control example on a limitation of a field of view for a part of a screen section.
Figure 5B:
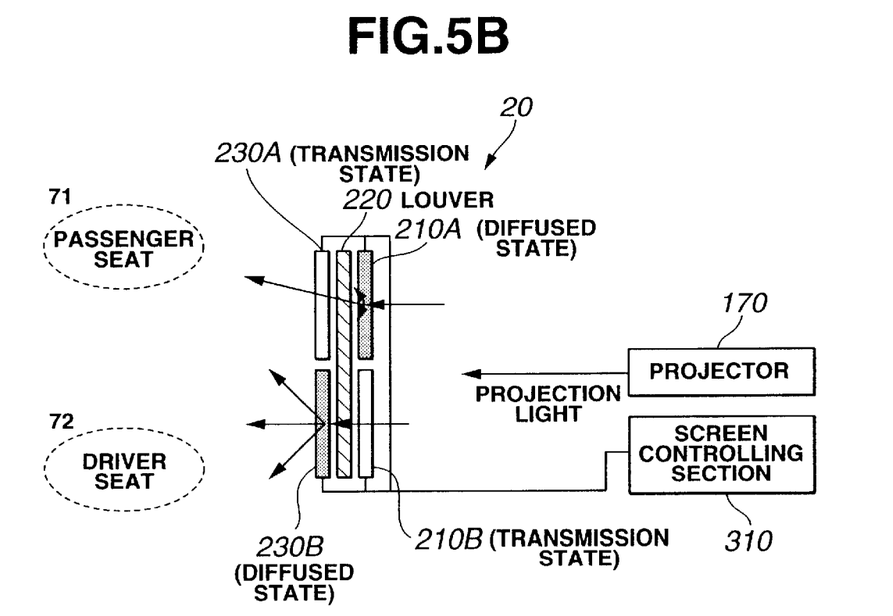
Figure 6A:
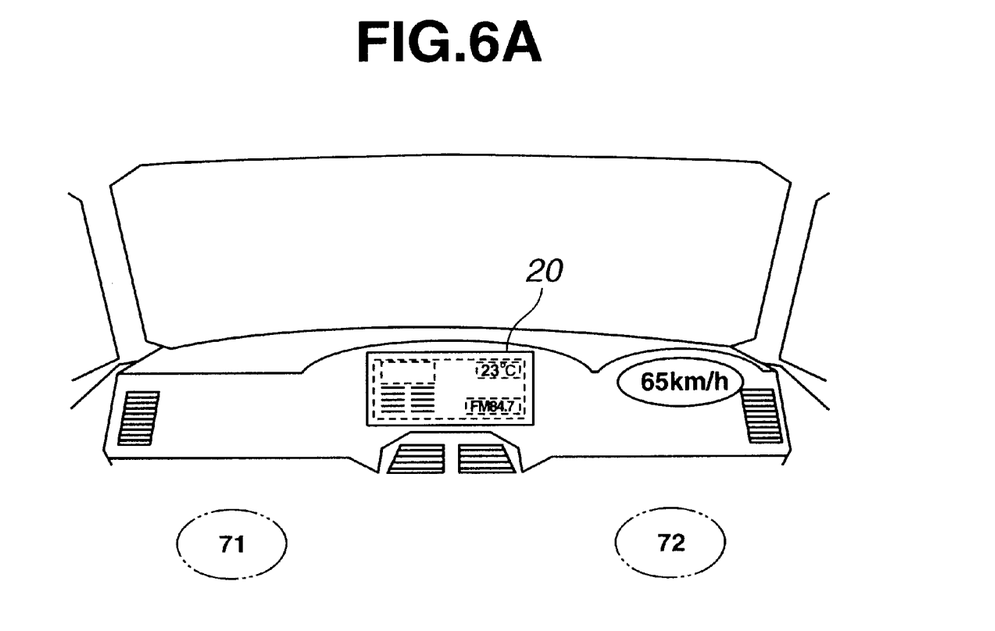
FIGS. 6A and 6B are explanatory views for explaining examples of display patterns when the limitation of the field of view for the part of the screen is carried out or not carried out.
Figure 6B:
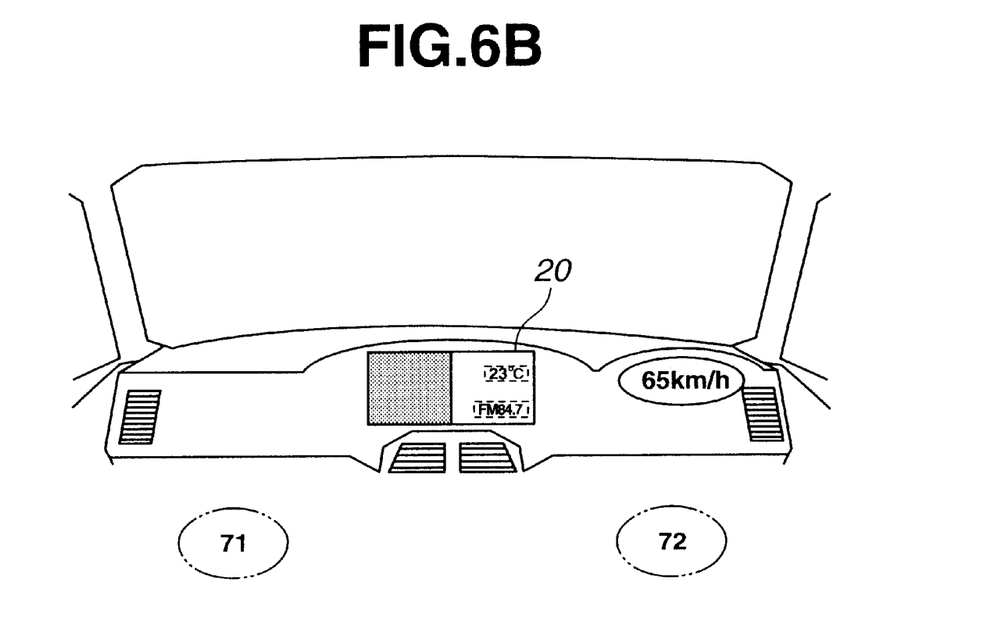
Figure 7A:
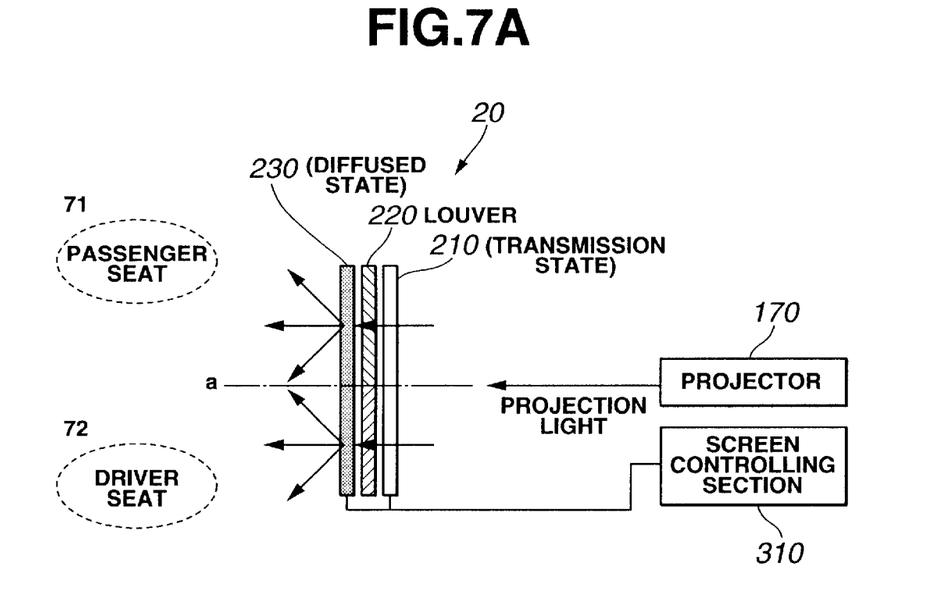
FIGS. 7A and 7B are explanatory views for explaining a second control example on a limitation of a field of view in a direction of the screen section.
Figure 7B:
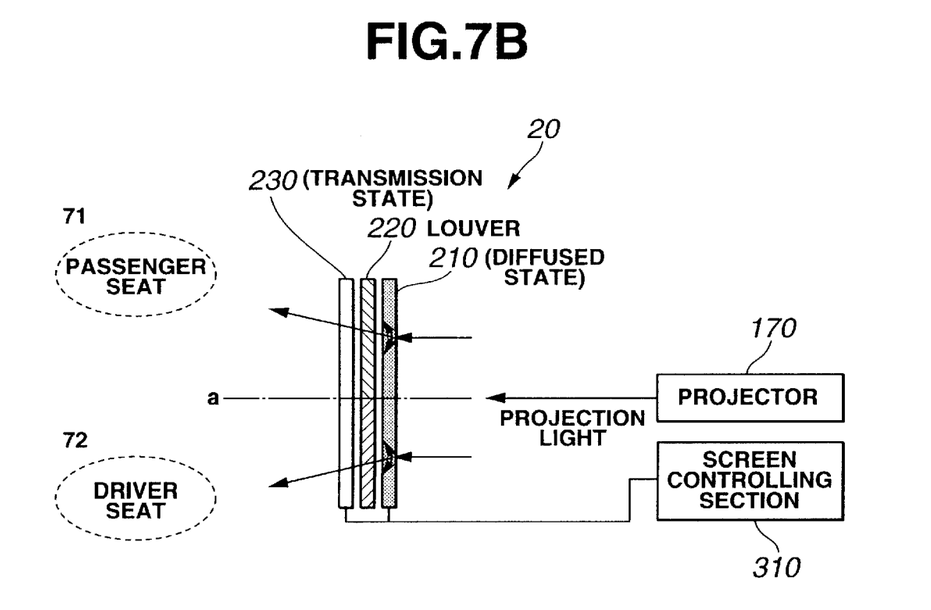

Next, FIG. 2 shows a rough configuration of the display apparatus mounted in the vehicle in a preferred embodiment according to the present invention. FIG. 3 shows a circuit block diagram representing a configuration of the display apparatus shown in FIG. 2. FIG. 4 shows a relationship between an eye position of a viewer and a position of the display apparatus shown in FIG. 3. FIGS. 5A and 5B show explanatory views for explaining the field of view limitation on a part of the two sheets of screen. FIGS. 6A and 6B show examples of display patterns in a case where the field of view limitation is carried out for the part of the screen. FIGS. 7A and 7B show explanatory views for explaining the field of view limitation for a certain direction of the two sheets of screen. First, a general concept of display apparatus 1 will be described in the case of the embodiment on the basis of FIGS. 2 through 4. Subsequently, the field of view control on a predetermined position will be described with reference to FIGS. 5A through 6B. The field of view control in a predetermined direction will be described with reference to FIGS. 7A and 7B.

FIG. 2 shows the rough configuration of display apparatus 1 mounted in the vehicle. Display apparatus 1 roughly includes a light projecting section 10; a screen section 20; and a controlling section 30. The light projecting section 10 includes an image data generating section 100, an image controlling section 110, and a light source controlling section 130. Image data generating section 100 generates various image data on the basis of a vehicular state information, an information from a navigation system, an information from a vehicle mounted (on-vehicle) camera, and an information from an external to the vehicle. Image controlling section 110 controls light source controlling section 130, a color separation controlling section 140, and display element controlling section 150. The display image thus controlled is projected from projection 170 having a light source, a display element, and a projection lens into a screen section 20.

Next, a formation of the display image by screen section 20 will be described below with reference to FIG. 3.

Light source section 131 which receives a control signal from a light source controlling section 130 radiates a light which forms a display image. This light is decomposed into three primary colors by means of a filter 132 controlled by a color decomposition controlling section 140. In the first embodiment, light source section 131 is used which includes components of three primary colors. However, another light source which emits respective three primary colors independently of each other. The light thus decomposed is supplied to an integrator 141 to be converted into a parallel light. Light deflecting section 151 deflects light from integrator 141 and supplies the light from integrator 141 to a lens group 160. Light deflecting section 151 constituted by a DMD (Digital Micro Mirror Device), LCD (Liquid Crystal Display), or reflection type LCD. The light condensed by lens group 160 is expanded and projected toward screen section 200. Screen section 200 includes first screen 210 and second screen 230. A louver filter 220 which constitutes the filed of view limiting section is interposed between first screen 210 and second screen 230 so that each surface of louver filter 220 is parallel to each of first and second screens 210 and 230. Each of first screen 210 and second screen 230 is constituted by a dispersion type liquid crystal which is in a light transmission state when a certain voltage is applied thereto and in a light diffused state when no voltage is applied thereto. Transparent electrodes across which the voltage is applied to each of first and second screens 210 and 230 is installed on each surface (front and rear surfaces) of first screen 210 and second screen 230. A control such as to render each of first and second screens 210 and 230 in the light transmission state or in the light diffusion state is executed according to a vehicular state by means of a screen controlling section 310 of controlling section 30. A vehicular state detecting section 300 detects a vehicular state.

In this embodiment, the state of each of first screen 210 and second screen 230 is controlled in accordance with a vehicular state. Specifically, the field of view by the vehicular driver is limited by not displaying an information other than an information required for the vehicular run on the vehicle during a travel state in which the vehicle is traveling. It is noted that such a phrase that the vehicle is traveling means that the vehicle is traveling at a vehicular velocity higher than zero.

In addition, louver filter 220 interposed between first screen 210 and second screen 230 functions as field of view controlling section to limit the field of view in a predetermined direction. In the first embodiment, louver filter 220 in which a miniature shutting plate is laminated by a predetermined pitch over a display surface thereof is adopted. Although louver filter 220 is interposed in such a way that the field of view in the predetermined direction is previously limited, louver filter 220 may be constituted so that the direction of the field of view limited in accordance with an electrical or mechanical operation from an external of the vehicle.

FIG. 4 shows a positional relationship from among screen section 20 of display device 1, a projector 170 of projection section 10, and an eye point 70 of the viewer.

Projecting section 10 and eye point 70 are positioned so that screen section 20 is sandwiched between projecting section 10 and eye point 70. At this time, first screen 210 of screen section 20 is dispersed toward projecting section 10 and second screen 230 thereof is dispersed on the viewer's eye point side 70. The explanation of the embodiment of the display apparatus will be made with the positional relationship described above as a pre-requisite.

Display apparatus 1 in this embodiment uses the principle of control on the basis of which the display apparatus according to the present invention is operated with reference to FIGS. 1A and 1B. In brief, in a case where no limitation of field of view is carried out, the voltage is applied to first screen 210 at the projection side so as to be in the transmission state (a state of the corresponding screen in which the display image is transmitted). On the other hand, with no voltage applied to second screen 230 placed at the viewer side in the light diffusion state, second screen 230 displays the display image. In this state, the projected light transmits first screen 210, transmits louver filter 220, is diffused by second screen 230, so that a user placed at passenger seat 72 can visually recognize the projected image. On the other hand, in a case where the field of view limitation is carried out, the display image is displayed with first screen 210 located at the projection side in the light diffusion state and with the voltage applied to second screen 230 located at the light diffusion side converted into the transmission state. At this time, the display image formed on first screen 210 and second screen 230 receives the limitation of filed of view by means of louver filter 220.

Consequently, louver filter 220 limits the field of view in the direction of driver seat 72. Although the display image can visually be recognized from passenger seat 71, the field of view from driver seat 72 is limited. In this way, a control pattern received by louver filter 220 is different depending upon whether the display image is formed on first screen 210 located at the projector side or on second screen 230 located at the viewer side. Thus, the field of view in the predetermined direction can be controlled. For example, any vehicular occupant including those sit on the driver seat and passenger seat can visually recognize the display image such as that in a television broadcasting if the vehicle is stopped. On the other hand, if the vehicle is traveling, the states of respective first and second screens 210 and 230 can be controlled so that, when the vehicle is traveling, an attention force of the vehicle driver can highly be maintained with the vehicle driver disabled to visually recognize the display image.

In this embodiment, the control of first and second screens 210 and 230 can be carried out. In this embodiment, the direction of field of view can be controlled in accordance with the direction of louver filter 220 (the direction in which the field of view is limited) and the control of louver filter 220 can be released by turning second screen 230 into the light diffusion state. Thus, the switching of the respective states of first and second screens 210 and 230 permits various types of controls in the direction of filed of view, the region of the field of view, and the timing.

In addition, if the dispersion type liquid crystal is adopted to screen section 20, a transmission factor at the time of transmission state of the dispersion type liquid crystal is relatively higher than that of liquid crystal filter using a polarization plate so that the display image becomes brilliant and a clear image can be displayed.

Next, two control examples will hereinafter be described with such a basic control as described above being a prerequisite.

FIRST CONTROL EXAMPLE

First, as a first example, an operation of display apparatus 1 in a case where first screen 210 and second screen 230 are divided into predetermined blocks and first and second screens 210 and 230 are controlled will be described with reference to FIGS. 5A, 5B, 6A, and 6B. A more high degree of controls is achieved by dividing first screen 210 and second screen 230 into the predetermined blocks or by varying directions which are controlled by louver filter 220 for each of the predetermined regions.

FIGS. 5A, 5B, 6A, and 6B show views of screen section 20 from a direction parallel to the display surfaces of screen section 20. As shown in FIGS. 5A and 5B, first screen 210 is divided into a first block 210A which faces toward passenger seat side 71 and a second block 210B faced toward driver seat 72. Similarly, second screen 230 is divided into a third block 230A faced toward passenger seat side 71 and a fourth block 230B faced toward driver seat side 72. Field of view limiting section 220 in this embodiment interposed between first and second screens 210 and 230 includes louver filter of a type wherein minute shutter plates are laminated by the predetermined pitch on one another over the display surface thereof.

The light diffusion state and the light transmission state of first and second screens 210 and 230 are controllable independently for each divided block of first through fourth blocks. This block can be set for an arbitrary portion with respect to the respective display images. For example, each block may be set in accordance with a position at which the display image is formed, each block may be formed according to a purpose of the displayed image or each block may be formed in accordance with the content of information displayed through the display image.

Display apparatus 1 can be divided into a driver purpose display block which displays the information to the vehicle driver and another display block than the driver purpose display block. In the preferred embodiment, display block is divided into a required information block which displays the information required for the driving to the vehicle driver and a display block other than the required information display block. The required information block displays an information required for the driver including a vehicular control information such as a vehicular velocity, an audio equipment manipulation information (ON and OFF), an in-vehicle (passenger compartment) environment information such as a room temperature or a road map information, a positional information, and other navigation information. For this required information block, no field of view control is carried out and the whole required information block is displayed to the vehicle driver.

FIG. 5A shows an example of control in a case where no field of view limitation is carried out. As shown in FIG. 5A, a given voltage is applied to both of first and second blocks 210A and 210B of first screen 210 so that each of the first and second blocks 210A and 210B becomes the light transmission state in which the display image is transmitted therethrough. On the other hand, no voltage is applied to both of third and fourth blocks 230A and 230B of second screen 230 so that each of third and fourth blocks 230A and 230B becomes the light diffusion state, viz., the display image can be viewed from any position of the vehicular compartment.

In details, the image projected from projector 170 located on a rear surface side of screen section 20 is transmitted through first and second blocks 210A and 210B of first screen 210 which are light transmissible state. Then, the image from projector 170 transmits through louver filter 220 and is projected onto third and fourth blocks 230A and 230B faced toward the passenger seat 71 and driver seat 72. Since third and fourth blocks 230A and 230B are in the light diffusion state, the display image which is visually recognizable is formed. The display image formed on second screen 230 is visually recognized from both positions of passenger seat 71 and driver seat 72 without limitation on field of view by louver filter 220.

FIG. 5B shows an example of control in a case where the field of view limitation is carried out for part of display image (predetermined block). It is noted that first block 210A of first screen 210 is in the light diffusion state without supply of given voltage thereto. On the other hand, the given voltage is applied to second block 210B of first screen 210 so as to be fallen in the light transmission state. In addition, the given voltage is applied to third block 230A of second screen 230 so as to be fallen in the light transmission state but no voltage is applied to fourth block 230B of second screen 230 so as to be fallen in the light diffusion state, viz., so that the display image is viewed through the fourth block 230B. The image projected from projector 170 located on the rear surface of screen section 20 is transmitted only through second block 210B of first screen 210. At this time, since first block 210A is in the light diffusion state, the display image at passenger seat side 71 is formed on first block 210A. The display image formed thereon passes through louver filter 220. At this time, since first block 210A is in the light diffusion state, a part of display image located at passenger seat side 71 is visually recognized only from passenger seat side 71

On the other hand, the display image projected from projector 170 onto second block 210B at the driver seat 72 of first screen 210 is transmitted through louver filter 220, and is projected onto fourth block 230B of second screen 230.

Since fourth block 230B is in the light diffusion state, the display image is formed thereon. The display image formed on fourth block 230B of second screen can visually be recognized from both directions of passenger seat 71 and driver seat 72 without receiving the limitation on the field of view by means of louver filter 220

As described above, from among the display images that screen section 20 projects, the display image at driver seat side can visually be recognized from both of driver seat side 72 and passenger seat side 71. On the other hand, the display image at the passenger seat side 71 cannot virtually be recognized from the driver seat 72, as shown in FIG. 5B. This permits the selective display of the information required for driving of the vehicle, a selection of music in an audio equipment of the vehicle, an operational state of an air-conditioner of the vehicle, a vehicular positional information, and a navigation information such as a road map information. On the other hand, screen section 20 at passenger seat 71 side selectively displays an internet representation, a mail information, and a television broadcasting image so that a person which can visually recognize each block and location can be limited or selected.

FIGS. 6A and 6B diagrammatically show display states of display apparatus 1 for which such a control as described above with reference to FIGS. 5A and 5B is executed.

In the embodiment, each of first screen 210 and second screen 230 is divided into two blocks. However, there is no limitation on the number of blocks to be divided. FIG. 6A shows a display state of screen section 20 in a case where the limitation of field of view for the vehicle driver is not carried out.

As shown in FIG. 6A, the display images visually recognizable from the driver are denoted by enclosed area in a dot line and the display image can visually be recognized from driver seat 72 and passenger seat 71. FIG. 6B shows the display state of screen section 20 in a case where the control on the field of view for the vehicle driver is carried out. What the driver can virtually recognize includes only an information required during the traveling of the vehicle such as a passenger compartment temperature displayed on part of screen located at driver seat side 72, navigation information, and information on an audio channel. Hence, the driver cannot visually recognize an information (a portion on the passenger seat side 71 (in a thin Indian ink) as appreciated from FIG. 6B. It is of course that this is related to the field of view from the driver and the information displayed at the passenger seat side 71 can virtually be recognized. This control can be carried out at a predetermined timing. Hence, during the stop of the vehicle, the limitation of the field of view is not carried out but all passengers including the driver can visually recognize a common information during the stop of the vehicle without limitation on the field of view. In addition, during the travel of the vehicle, the limitation on the field of view is carried out only for the driver and other occupant can visually be recognized so that the information can visually be recognized. The display state can be controlled depending upon the vehicular situation.

First screen 210 and second screen 230 are divided into predetermined blocks or predetermined display blocks, these blocks being independently controlled. Hence, while the field of view to a certain display image is limited, the field of view to another display image can be assured. Display apparatus 1 which controls the field of view for each predetermined block can be provided.

With a sufficient consideration paid to a standpoint of the driver to carry out a safety driving, the field of view to such a display image that would perturb the driver from the vehicular driving can be limited and a more comfortable vehicular driving assistance can be achieved.

SECOND CONTROL EXAMPLE

Next, a direction of control in the field of view of louver filter 200 is different for each predetermined region, viz., for each side of driver seat 72 and passenger seat 71. This will be explained in detail with reference to FIGS. 7A and 7B.

In this embodiment, louver filter 220 in screen section 20 serves to limit the field of view of a direction which is different for each predetermined region. That is to say, louver filter 220 in screen section 20 shown in FIGS. 7A and 7B is structured so that the direction of the field of view that louver filter 220 limits is made different with a center a between passenger seat side 71 and driver seat side 72 of display surface as a boundary. Specifically, a plurality of shutter plates (shield plates) are laminated with slight gradients of a part of louver filter 220 tilted toward passenger seat side 71 (an upper part of louver filter 220 as viewed from FIGS. 7A and 7B) so as to limit the field of view from driver seat side 72 and are laminated with other slight gradients of another part of louver filter 220 (a lower part of louver filter 220 as viewed from FIGS. 7A and 7B) at driver seat side 71 tilted toward the driver seat side so as to limit the field of view from passenger seat side 71. It is preferable to specifically set the direction which louver filter 220 controls as field of view controlling section according to a position of display apparatus 1 and a position of an observer which is an object of the limitation of the field of view, for example, a vehicular occupant.

FIG. 7A shows screen section 20 in which no limitation of field of view is carried out. The display image projected from projector 170 is projected onto first screen 210. The display image is passed through first screen 210 since the given voltage is applied to first screen 210 which is turned in the light transmission state and is passed through louver filter 220 to reach to second screen 230. No voltage application to second screen 230 is carried out and, hence, second screen 230 indicates the light diffusion state so that the display image is formed. The display image formed over second screen 230 does not receive the limitation by means of louver filter 220 so as to be enabled to be visually recognized from both passenger seat side 71 and driver seat side 72.

FIG. 7B shows a state in which a limitation of field of view in a predetermined direction is carried out. The display image projected from projector 170 is projected onto first screen 210. Since first screen 210 is in the light diffusion state without application of the voltage, the display image is formed over first screen 210 for the projected display image to be enabled to be visually recognized. However, louver filter 220 at the passenger seat side 71 through which the display image is passed serves to limit the field of view from driver seat side 72 and louver filter 220 at the driver seat side 72 serves to limit the field of view from passenger seat side 71. Furthermore, since the voltage is applied to second screen 230 through which the display image is subsequently passed so as to be turned into the light transmission state, the display image is displayed with the limitation by means of louver filter 220 received. Then, the display image at passenger seat side 71 is visually recognized only from passenger seat side 71 and the display image at the drive seat side 72 can visually be recognized only from the driver seat side 72, as shown in FIG. 7B. In this way, the direction in which the display image is visually recognized can be limited in accordance with the direction in which louver filter 220 limits the field of view. Consequently, display apparatus 1, in this embodiment, can have the driver visually recognize the display image and can have the driver visually un-recognize the display image.

As described above, since a mutual recognition of the information between the passenger seat side and the occupant seat side cannot be made, a mutually different information can be provided or a mutually personal information can be handled. The case of FIG. 7A is applicable to the case where the vehicle is stopped and the case of FIG. 7B is applicable to the case where the vehicle is traveling.

It is noted that the gradients of louver filter 220 may arbitrarily be set, this setting may be predetermined, the direction of the limitation of field of view may be arbitrary or may be predetermined. The setting of the gradients of the shutter plates in louver filter 220 may be arbitrary. Direction of limitation of field of view of louver filter 220 may be modified through an external manipulation. The setting of louver filter 220 permits an easy limitation of the field of view. As described hereinabove, first screen 210 and second screen 230 are divided into arbitrary blocks, each divided block being independently controlled. The setting of louver filter 220 permits an easy limitation of the field of view. In addition to this control, the direction of field of view is limited for each predetermined region of the display image, such various controls as to the direction at which the display image is visually recognized, the block, and the timing can be performed.

According to the second control example, louver filter 220 interposed between two sheets of screens can arbitrarily control the field of view in the predetermined direction for the display image for each region. Hence, display apparatus 1 which controls the field of view for each predetermined region at a predetermined timing can be provided.

According to the present invention, an area which is virtually recognizable can dynamically be modified. Furthermore, the field of view visually recognizable can be controlled in accordance with the display blocks such as required information blocks. Electrical control and limitation of the direction of field of view of louver filter 220 can easily be carried out. Furthermore, since, according to the projection type display as described in the preferred embodiment, first and second screens 210 and 230 constituted by a dispersion liquid crystal without use of polarization plates can be applied. Hence, display apparatus 1 having a high-quality display image and having a high transmittance factor can be provided.

While the preferred embodiment of the present invention has been described using specific terms, such description is for illustrative purpose only, and it is to be understood that changes and variations may be made without departing from the spirit or scope of the following claims. It is of course that, although the embodiment of display apparatus 1 have been described with a right-hand drive vehicle taken into consideration, the present invention can naturally be applied to a left-hand drive vehicle.

The entire contents of a Japanese Patent Application No. 2001-309330 (filed in Japan on Oct. 5, 2001) are herein incorporated by reference. The scope of the invention is defined with reference to the following claims.

What is claimed is:

1. A display apparatus comprising:
   a projecting section that projects a display image;
   a first screen enabled to switch its state between a light transmission state in which the projected display image is transmitted therethrough and a light diffusion state in which the projected display image is projected thereon;
   a second screen enabled to switch its state between the light transmission state and the light diffusion state;
   a field of view limiting section interposed between the first screen and second screen to limit a field of view of a predetermined direction; and
   a controlling section that controllably switches the respective states of the first and second screens.

2. A display apparatus as claimed in claim 1, wherein each of the first and second screens is divided into predetermined blocks and wherein the controlling section controllably switches the respective states of the first and second screens for each of the predetermined blocks.

3. A display apparatus as claimed in claim 1, wherein the field of view limiting section limits the field of view of a direction which is different for each of predetermined regions of the display image.

4. A display apparatus as claimed in claim 1, wherein the display apparatus is mounted in a vehicular compartment, the controlling section comprises a vehicular travel state detecting section that detects a travel state of the vehicle, and the controlling section controls the respective states of the first and second screens in accordance with the travel state of the vehicle detected by the vehicular travel state detecting section.

5. A display apparatus as claimed in claim 4, wherein each of the first and second screens is divided into a vehicle driver purpose display block and another display block than the vehicle driver purpose display block and the controlling section controls the respective states of the first and second screens in such a manner that the display image displayed on the other display block is visually unrecognizable from a driver seat in accordance with the vehicular travel state detected by the vehicular travel state detecting section.

6. A display apparatus as claimed in claim 4, wherein each of the first and second screens is divided into a required information display block on which an information required for a vehicular driving is mainly displayed and another display block than the required information display block and the controlling section controls the respective states of the first and second screens in such a manner that the display image displayed on the other display block is visually unrecognizable from a driver seat in accordance with the vehicular travel state detected by the vehicular travel state detecting section.

7. A display apparatus as claimed in claim 4, wherein the controlling section controls the respective states of the first and second screens in such a manner that the display image is visually unrecognizable from a driver seat when the travel state detecting section detects that the vehicle is traveling at a vehicular velocity higher than zero.

8. A display apparatus as claimed in claim 4, wherein the field of view limiting section limits the field of view of the direction from a driver seat of the vehicle.

9. A display apparatus as claimed in claim 4, wherein the field of view limiting section limits the field of view in a direction which is different for each predetermined region of the display image.

10. A display apparatus as claimed in claim 9, wherein the field of view limiting section limits the field of view of at least one predetermined region of the display image so as to be visually unrecognizable from the driver seat.

11. A display apparatus as claimed in claim 10, wherein the field of view limiting section limits the field of view of another predetermined region than the predetermined region of the display image in such a manner as to enable the field of view of the other predetermined region to be visually recognized from the driver seat.

12. A display apparatus as claimed in claim 9, wherein the field of view limiting section comprises a louver filter having a plurality of shutter plates laminated on one another, gradients of the shutter plates in a first predetermined region of each of the first and second screens located at a passenger seat side being tilted toward the passenger seat side, and those in a second predetermined region of each of the first and second screens located at a driver seat side being tilted toward the driver seat side.

13. A display apparatus as claimed in claim 12, wherein, when the travel state detecting section detects that the vehicle is traveling at a vehicular velocity higher than zero, the controlling section applies a given voltage to the second screen for the second screen to be in the light transmission state with no voltage applied to the first screen for the first screen to be in the light diffusion state, whereby the display image from the first predetermined region is visually recognizable only at the passenger seat side and the display image from the second predetermined region is visually recognized only at the driver seat side.

14. A display apparatus as claimed in claim 13, wherein, when the travel state detecting section detects that the vehicle is stopped, the controlling section applies the given voltage to the first screen for the first screen to be in the light transmission state with no voltage applied to the second screen for the second screen to be in the light diffusion state, whereby the display image from the first predetermined region is visually recognizable at both of the passenger seat side and the driver seat side and the display image from the second predetermined region is visually recognized at both of the driver seat side and the passenger seat side.

15. A display apparatus as claimed in claim 14, wherein each of the first and second screens is constituted by a dispersion liquid crystal.

16. A display apparatus as claimed in claim 8, wherein the field of view limiting section comprises a louver filter having a plurality of shutter plates laminated over one another, each gradient of the shield plates being the same and being tilted toward a passenger seat.

17. A display apparatus as claimed in claim 16, wherein the first screen is divided into first and second blocks, the first block being located at a passenger seat side and the second block being located at a driver seat side, the second screen is divided into third and fourth blocks, the third block being faced with the first block via the louver filter and the fourth block being faced with the second filter via the louver filter, and, when the vehicular travel state detecting section detects that the vehicle is traveling at a vehicular velocity higher than zero, the controlling section applies a given voltage to each of the second and third blocks for each of the second and third blocks to be in the light transmission state with no voltage applied to each of the first and fourth blocks for each of the first and fourth blocks to be in the light transmission state, whereby the display image from the passenger seat side via the third block is visually recognized only at the passenger seat side and the display image from the driver seat side is visually recognized at both of the driver seat side and the passenger seat side.

18. A display apparatus as claimed in claim 17, wherein, when the vehicular travel state detecting section detects that the vehicle is stopped, the controlling section applies the given voltage to the first and second blocks of the first screen for each of the first and second blocks to be in the light transmission state with no voltage applied to the third and fourth blocks of the second screen for each of the third and fourth blocks to be in the light diffusion state, whereby the display image from the passenger seat side is visually recognized at both of the passenger seat side and the driver seat side and the display image from the driver seat side is visually recognized at both of the passenger seat side and the driver seat side.

19. A display method comprising:

projecting a display image;

providing a first screen enabled to switch its state between a light transmission state in which the projected display image is transmitted therethrough and a light diffusion state in which the projected display image is projected thereon;

providing a second screen enabled to switch its state between the light transmission state and the light diffusion state;

providing a field of view limiting section interposed between the first screen and second screen to limit a field of view of a predetermined direction; and controllably switching the respective states of the first and second screens.

20. A display apparatus comprising:

projecting means for projecting a display image;

first screen means enabled to switch its state between a light transmission state in which the projected display image is transmitted therethrough and a light diffusion state in which the projected display image is projected thereon;

second screen means enabled to switch its state between the light transmission state and the light diffusion state;

field of view limiting means interposed between the first screen and second screen for limiting a field of view of a predetermined direction; and controlling means for controllably switching the respective states of the first and second screens.

* * * * *